(12) United States Patent
Irie

(10) Patent No.: US 9,975,304 B2
(45) Date of Patent: May 22, 2018

(54) TIRE MANUFACTURING METHOD

(71) Applicant: BRIDGESTONE CORPORATION, Chuo-ku, Tokyo (JP)

(72) Inventor: Kohei Irie, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 271 days.

(21) Appl. No.: 14/784,522

(22) PCT Filed: Apr. 25, 2014

(86) PCT No.: PCT/JP2014/002337
§ 371 (c)(1),
(2) Date: Oct. 14, 2015

(87) PCT Pub. No.: WO2014/178181
PCT Pub. Date: Nov. 6, 2014

(65) Prior Publication Data
US 2016/0059501 A1 Mar. 3, 2016

(30) Foreign Application Priority Data
May 1, 2013 (JP) .................................. 2013-096356

(51) Int. Cl.
*B29D 30/06* (2006.01)
*B29D 30/66* (2006.01)
*B29K 21/00* (2006.01)

(52) U.S. Cl.
CPC ..... *B29D 30/0606* (2013.01); *B29D 30/0678* (2013.01); *B29D 30/0681* (2013.01);
(Continued)

(58) Field of Classification Search
None
See application file for complete search history.

(56) References Cited

U.S. PATENT DOCUMENTS 2,724,425 A 11/1955 Ostling
4,715,577 A 12/1987 Greenwood et al.

FOREIGN PATENT DOCUMENTS

DE 2103096 A1 7/1972
DE 19846365 A1 4/2000
(Continued)

OTHER PUBLICATIONS

Aug. 5, 2014 International Search Report issued in International Patent Application No. PCT/JP2014/002337.

*Primary Examiner* — Christina Johnson
*Assistant Examiner* — Mohammad M Ameen
(74) *Attorney, Agent, or Firm* — Kenja IP Law PC

(57) ABSTRACT

A tire manufacturing method in which a vulcanizing mold (20) is provided with a tire molding portion (21) defining an outer surface shape of a tire (1), an extrusion preparing portion (22) in which an unvulcanized rubber member (5) that forms a tread portion (2) can be disposed, and a rubber inflow path (23) communicating between the tire molding portion (21) and the extrusion preparing portion (22), wherein vulcanization molding includes: loading a casing member (4) in the tire molding portion (21) and loading the unvulcanized rubber member (5) in the extrusion preparing portion (22); extruding the unvulcanized rubber member (5) to tread molding portions (21c), (21d) through the rubber inflow path (23), the tread molding portions formed in the tire molding portion (21) and defining an outer surface shape of a land portion of the tire; and vulcanizing the unvulcanized rubber member (5) and casing member (4) together.

4 Claims, 3 Drawing Sheets

(52) U.S. Cl.
CPC ...... *B29D 30/66* (2013.01); *B29D 2030/0682* (2013.01); *B29K 2021/00* (2013.01)

(56) References Cited

FOREIGN PATENT DOCUMENTS

| | | | |
|---|---|---|---|
| FR | 1508135 | A | 1/1968 |
| JP | S52105983 | A | 9/1977 |
| JP | S63-264333 | A | 11/1988 |
| JP | 02-227243 | A * | 9/1990 |
| JP | H02-227243 | A | 9/1990 |
| JP | H06278227 | A | 10/1994 |
| JP | H07-32814 | A | 2/1995 |
| JP | 2006-321080 | * | 11/2006 |
| JP | 2006-321080 | A | 11/2006 |
| JP | 2011-031452 | A | 2/2011 |
| JP | 2012-045917 | A | 3/2012 |

* cited by examiner

TIRE MANUFACTURING METHOD

TECHNICAL FIELD

This disclosure relates to a manufacturing method of a tire having a tread portion provided with a land portion, and more particularly to a manufacturing method thereof in which a vulcanization molding is performed by using a vulcanizing mold.

BACKGROUND

In the past, in order to form a tire having a tread portion provided with a land portion (block, lug, or the like) in a tire tread portion, a manufacturing method in which a vulcanizing mold with its inner peripheral surface formed with concavities and convexities corresponding to blocks and lugs and a green tire formed by attaching a green tread to a green casing are prepared, and the green tire is loaded in the mold for vulcanization, then rubber of the green tread is flowed into the concavities while being pressed by the convexities of the mold has been generally used.

Although a carcass that forms a tire skeleton structure and a belt for reinforcement are disposed on desired positions inside the green casing, they may be locally pressed by the convexities of the mold or moved with the rubber flowing into the convexities, which may cause the belt, or the like, to be shifted from its original position and distortion may occur. In particular, tires mounted on agricultural vehicles used in the paddy field or the soft ground, or the like, or mounted on construction vehicles driving on the rough ground have high lugs rising from the outer surface of a tire body to obtain a high traction, which allows a lot of green tread rubber to be flowed into the concavities of the mold. Thus distortion of the carcass and the belt becomes pronounced and the tire performance may be affected.

As a technique for solving such a problem, for example, JP2012-045917A (PTL 1) illustrates a method in which a plurality of vulcanized lug members corresponding to lugs are previously loaded in a vulcanizing mold, then a green casing, which serves as a tire body, is loaded in the vulcanizing mold, and after that the lug members are vulcanized with a green casing to bond with one another. By this method, flowing of rubber into portions corresponding to the lugs of the mold is avoided, thus distortion of a carcass and a belt can be suppressed.

CITATION LIST

Patent Literature

PTL 1: JP2012-045917A

SUMMARY

Technical Problem

On the other hand, in the method described in PTL 1, a work for fitting a lug member to be molded in a required shape into a corresponding mold portion, with the lug member being aligned thereto, is required. Thus a relatively long period of time may be required for the work. Furthermore, when the lug member is not pushed enough, the fitted lug member may fall out of the mold or shift, thus the lug member may be needed to be fitted again. Thus, a tire manufacturing method that allows for reduction in time required for manufacture and provides an excellent workability has been required.

We therefore provide, in order to manufacture a tire having a tread portion provided with a land portion, a new tire manufacturing method in which distortion of a carcass and a belt caused by vulcanization is suppressed and work efficiency is improved while decreasing the time for manufacture.

Solution to Problem

The principal tire manufacturing method of this disclosure uses a vulcanizing mold comprising: a tire molding portion in which a casing member constituting a tire body is disposed, and which is configured to define an outer surface shape of the tire; an extrusion preparing portion in which an unvulcanized rubber member for forming a tread portion can be disposed; and a rubber inflow path communicating between the tire molding portion and the extrusion preparing portion, and the method includes: loading the casing member in the tire molding portion and loading the unvulcanized rubber member in the extrusion preparing portion; subsequently, extruding the unvulcanized rubber member to a tread molding portion through the rubber inflow path, the tread molding portion being formed in the tire molding portion and configured to define an outer surface shape of the land portion; and subsequently, vulcanizing the extruded unvulcanized rubber member and the casing member together.

By this manufacturing method, flowing of the rubber of the casing member into the tread molding portion is suppressed, thus distortion of the carcass and the belt can be suppressed. In addition, the land portion is formed into a required shape when the unvulcanized rubber member is extruded into the tread molding portion, thus it is not necessary to form the unvulcanized rubber member into a shape corresponding to the land portion. This allows for easy alignment of the unvulcanized rubber member when it is loaded in the mold. Furthermore, a work for fitting or refitting a plurality of lug members into each mold, as in the past, is no more needed, which allows for reduction in time required for manufacture and improvement of work efficiency. In addition, the temperature of the unvulcanized rubber member to be extruded rises due to friction against the surrounding members that is caused when the member flows or shear heating of the rubber itself or the like, thus less time is required for vulcanization.

Moreover, another tire manufacturing method of this disclosure is configured such that, in the above-described principal tire manufacturing method, the vulcanizing mold further comprises a pressing member disposed movably toward the extrusion preparing portion, wherein the pressing member is moved relative to the unvulcanized rubber member in the extrusion preparing portion to extrude the unvulcanized rubber member.

When the unvulcanized rubber member is extruded into the mold, a rubber injection molding machine is usually used. However, in this manufacturing method, the rubber member can be extruded by the pressing member provided in the vulcanizing mold, thus the cost required for the tire manufacturing facility can be reduced.

Furthermore, yet another tire manufacturing method of this disclosure is configured such that, in the above-described principal tire manufacturing method, a rigid core comprising a plurality of core segments is provided inside the vulcanizing mold, the plurality of core segments being disposed movably outward and inward in the tire radial direction, wherein the unvulcanized rubber member is extruded after moving the core segments outward in the tire radial direction to expand a diameter of the casing member.

When the unvulcanized rubber member flows at a high pressure, the casing member may be depressed inward in the tire radial direction and deformed. However, with this manufacturing method, the casing member is supported by the rigid core from inward in the tire radial direction, thus deformation of the casing member can be reliably suppressed.

Advantageous Effect

This disclosure provides, when a tire having a tread portion provided with a land portion is manufactured, a tire manufacturing method in which distortion of a carcass and a belt caused by vulcanization can be suppressed, and work efficiency can be improved while reducing the time required for manufacture as well.

DETAILED DESCRIPTION

Figure 1:
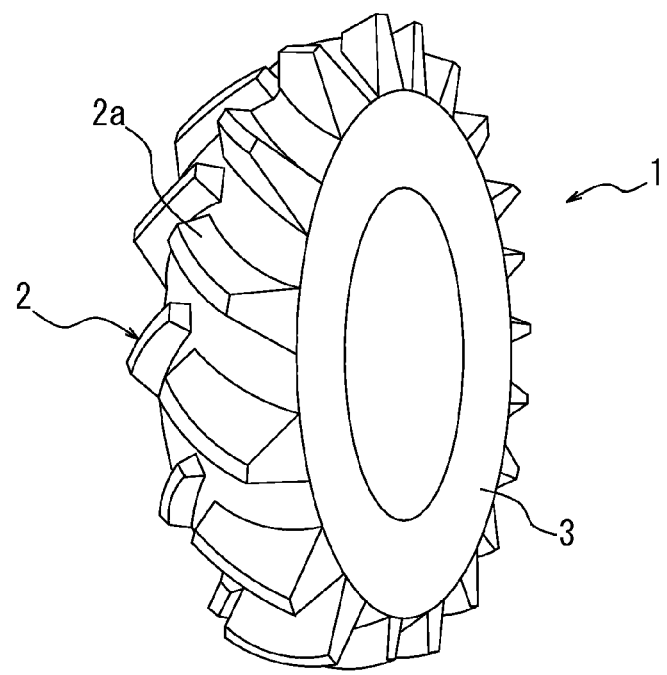
FIG. 1 is a perspective view of a tire for agricultural machines, which is an example of a tire manufactured according to this disclosure.

First, a tire formed by the disclosed manufacturing method is explained by taking a tire 1 for agricultural machines illustrated in FIG. 1 as an example. The tire 1 is generally formed of a tread portion 2 provided with a plurality of lugs 2a as a land portion and an annular tire body 3, which is the tire 1 without the tread portion 2. The tire 1 is formed by preparing a casing member 4 illustrated in FIG. 3, which serves as a tire body 3, and an unvulcanized rubber member 5 forming the tread portion 2 separately, and loading them in a vulcanizing mold 20 for vulcanization to bond with one another.

The casing member 4 has a structure in accordance with the tradition and includes, for example, a carcass toroidally extending between a pair of bead cores to form skeleton of the tire and a belt located on the outer peripheral side of a crown region of the carcass. Although the outer peripheral surface of the casing member 4 is not basically provided with a tread rubber, it may be provided with a thin tread rubber as needed. Besides the unvulcanized rubber member that is not vulcanized, depending on the type of the tire, semi-vulcanized rubber member that is partially vulcanized before being loaded into the vulcanizing mold 20 or completely vulcanized rubber member may be used as the casing member 4.

Figure 2:
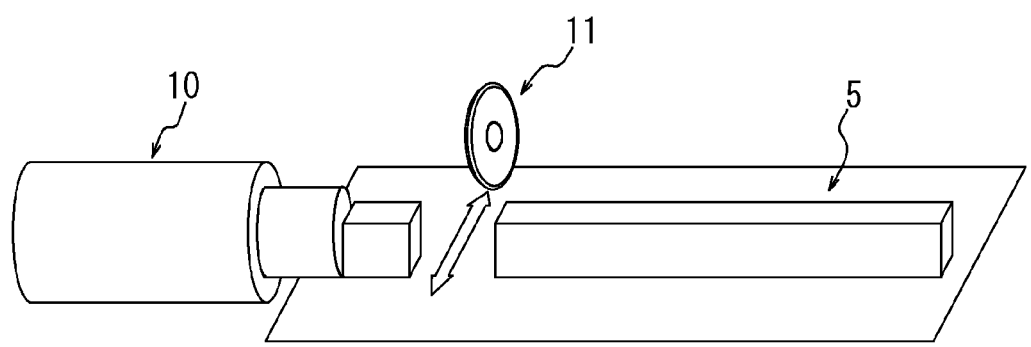
FIG. 2 schematically illustrates a situation of an unvulcanized rubber member used by this disclosure, where a long unvulcanized rubber member extruded from an extruder is cut into a predetermined length.

The unvulcanized rubber member 5 is formed of tread rubber, and various rubbers are chosen depending on the desired function of the tire. Further, the unvulcanized rubber member 5 according to this embodiment is prepared by cutting the rubber member, which is extruded by the extruder 10 into a predetermined cross-sectional shape as illustrated in FIG. 2, into a predetermined length by a cutting machine 11, which is schematically illustrated in the figure.

Figure 3:
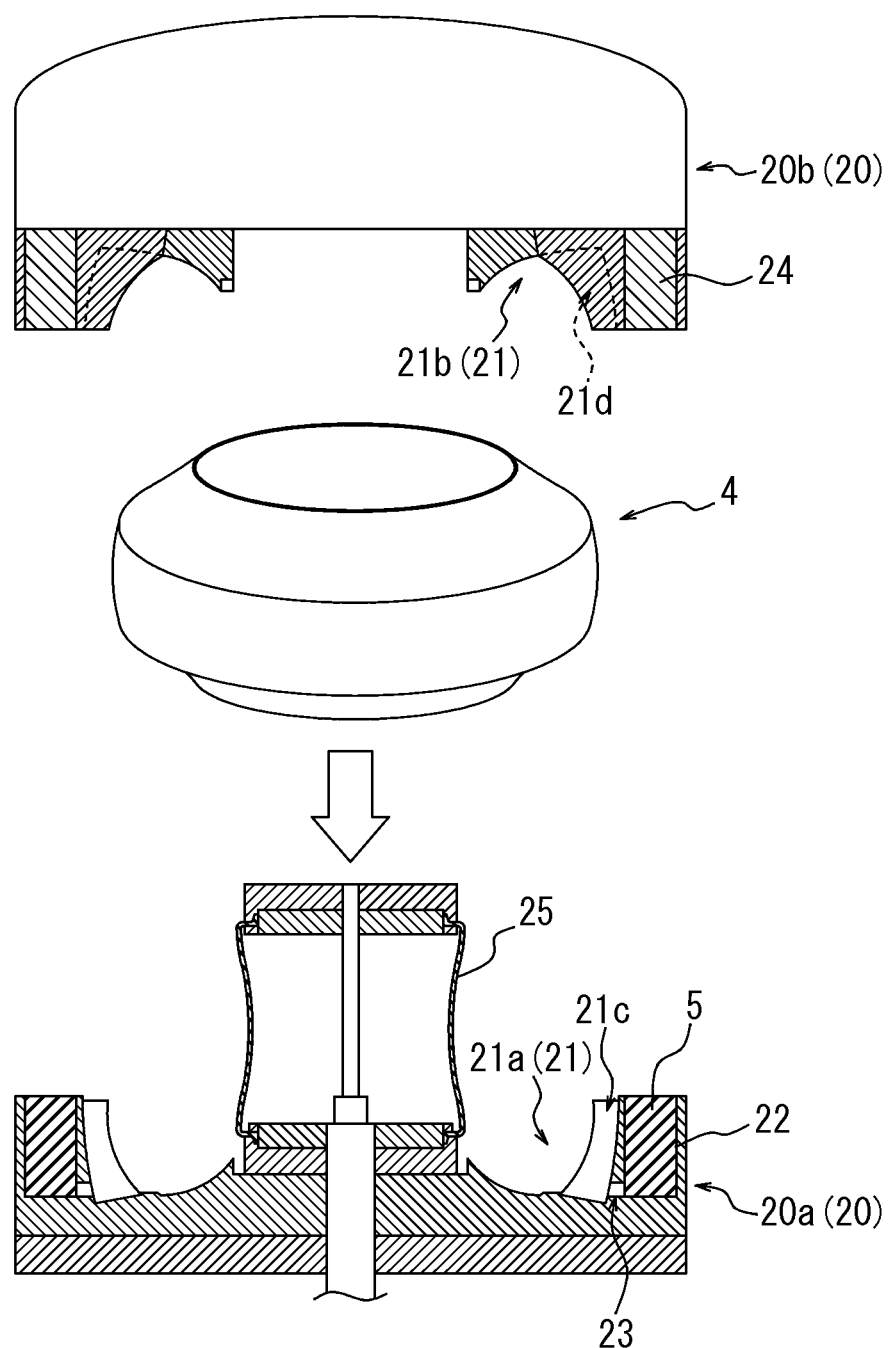
FIG. 3 is a cross-sectional diagram of one embodiment illustrating a situation where the unvulcanized rubber member and a casing member are loaded in an open vulcanizing mold.

Next, one embodiment of a vulcanizing mold 20 used by the disclosed manufacturing method is explained with reference to FIG. 3. The vulcanizing mold 20 includes a tire molding portion 21 that has the casing member 4 disposed therein and defines the outer surface shape of the tire 1, an extrusion preparing portion 22 in which the unvulcanized rubber member 5 formed into a predetermined shape can be disposed, and a rubber inflow path 23 communicating between the tire molding portion 21 and the extrusion preparing portion 22.

In this embodiment, the vulcanizing mold 20 is divided into two, an upper portion and a lower portion, and consists of a lower mold 20a and an upper mold 20b. A lower tire molding portion 21a and an upper tire molding portion 21b provided by dividing the tire molding portion 21 into two are formed inside of the lower mold 20a and the upper mold 20b, respectively. Furthermore, the extrusion preparing portion 22 is provided outward of the lower tire molding portion 21a in the tire radial direction. Note that the extrusion preparing portion 22 is not needed to be formed into a shape corresponding to the lug 2a, and it may be formed into a simple shape such as a rectangular cross-sectional shape as illustrated, for example, which allows alignment to be performed easier when the unvulcanized rubber member 5 is attached to the extrusion preparing portion 22. In addition, when a plurality of extrusion preparing portions 22 are provided, common unvulcanized rubber member 5 can be used if they have the same shape, thus work efficiency can be improved.

Furthermore, the rubber inflow path 23 according to this embodiment connects the extrusion preparing portion 22 and the portion corresponding to the lug 2a of the tire molding portion 21 (tread molding portion), and as illustrated, it is provided so that it connects to the portions corresponding to respective lugs 2a of the lower tire molding portion 21a (lower tread molding portion 21c), then other than that, provided so that, when the vulcanizing mold 20 is closed, it connects to the portions corresponding to respective lugs 2a of the upper tire molding portion 21b (upper thread molding portion 21d) as well, which is not illustrated.

Furthermore, the upper mold 20b is provided with, on a position thereof corresponding to the extrusion preparing portion 22 provided in the lower mold 20a, a pressing member 24 disposed movably toward the extrusion preparing portion 22. Thus, the unvulcanized rubber member 5 loaded in the extrusion preparing portion 22 is allowed to be flown into the lower tread molding portion 21c and the upper tread molding portion 21d through the rubber inflow path 23. In this manner, the extrusion preparing portion 22 and the pressing member 24 are provided in the vulcanizing mold 20, thus a rubber injection molding machine that is usually used when extruding an unvulcanized rubber member into a mold is no more needed.

Furthermore, the vulcanizing mold 20 is provided with, on a portion thereof located inward of the casing member 4 in the tire radial direction, a diameter expansion means that expands the diameter of the casing member 4 toward the sidewall of the tire molding portion 21. In this embodiment, the lower mold 20a is provided with a bladder 25 that swells outward in the tire radial direction. Note that, as a diameter expansion means, various kinds of means such as a structure by which a high pressure gas is blown to the inside of the casing member 4 to directly swell the casing member 4, a rigid core having a plurality of core segments disposed movably inward/outward in the tire radial direction or the like, which is not illustrated, can be applied.

Figure 4:
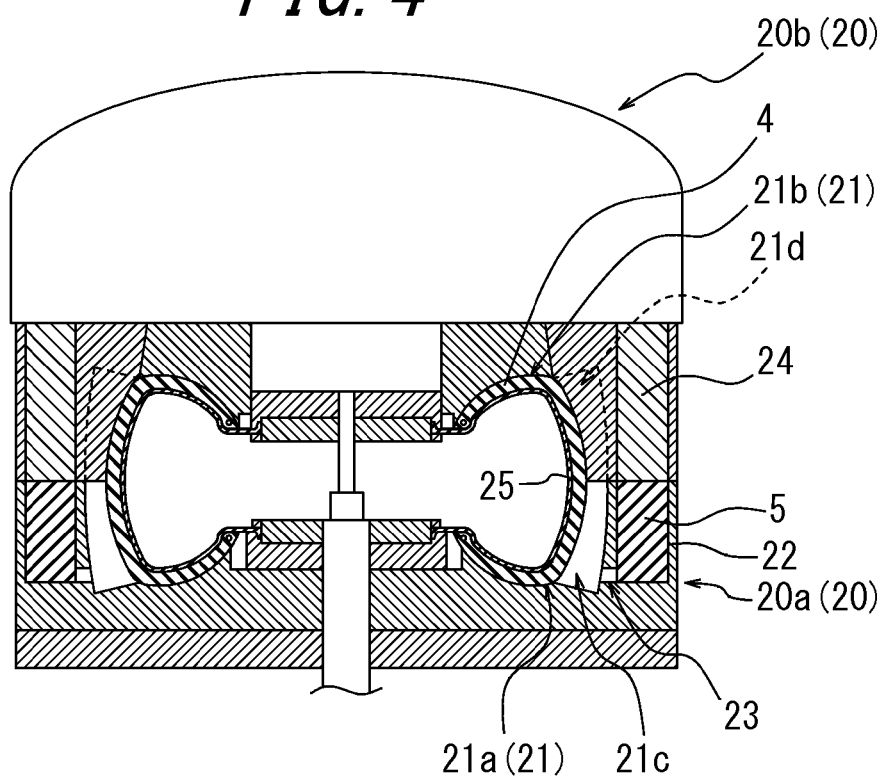
FIG. 4 is a cross-sectional diagram illustrating the vulcanizing mold that is closed from the state illustrated in FIG. 3.
Figure 5:
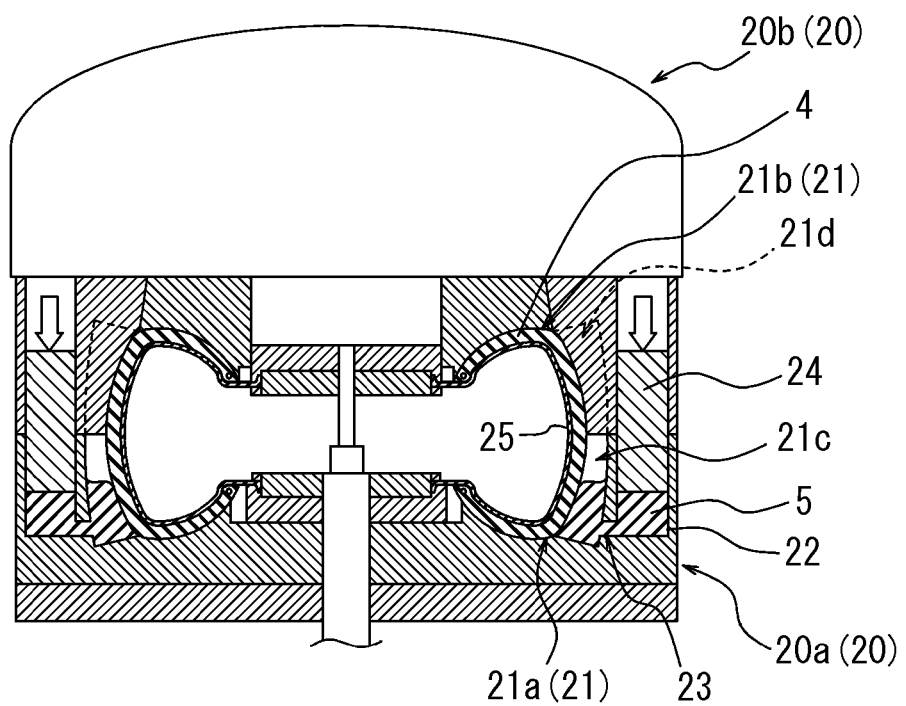
FIG. 5 is a cross-sectional diagram illustrating a situation where the unvulcanized rubber member is extruded, from the state illustrated in FIG. 4, to a tread molding portion.

Next, one embodiment of the disclosed tire manufacturing method is explained. In order to manufacture the tire 1, first, the casing member 4 and the unvulcanized rubber member 5 formed into a predetermined shape by the extruder 10 and the cutting machine 11, for example, are prepared. Then, as illustrated in FIG. 3, the unvulcanized rubber member 5 is loaded in the extrusion preparing portion 22 provided in the lower mold 20a and the casing member 4 is loaded in the lower tire molding portion 21a. Subsequently, as illustrated in FIG. 4, the upper mold 20b is moved relative to the lower mold 20a to close the vulcanizing mold 20, and a bladder 25 is operated to expand the diameter of the casing member 4 toward the sidewall of the tire molding portion 21. After that, as illustrated in FIG. 5, the pressing member 24 is operated to be moved toward the unvulcanized rubber member 5, thereby allowing the unvulcanized rubber member 5 in the extrusion preparing portion 22 to flow into the lower tread molding portion 21c and the upper tread molding portion 21d through the rubber inflow path 23. Here, if the pressure at the time when the unvulcanized rubber member 5 flows is larger than the pressure for swelling the bladder 25, the casing member 4 with an expanded diameter may be depressed inward in the tire radial direction. In this case, the depression of the casing member 4 can be prevented by using the rigid core as a diameter expansion means. After that, the casing member 4 and the unvulcanized rubber member 5 can be bonded with one another through vulcanization under required conditions (temperature, time, pressure). Note that, when the unvulcanized rubber member 5 flows, its temperature rises due to its friction against the surrounding members, shear heating of the rubber itself or the like, thus vulcanization proceeds more rapidly, and the time required for vulcanization can be reduced. In particular, in the tire 1 that includes the lug 2a as this embodiment, when the unvulcanized rubber member 5 is flown into the lower tread molding portion 21c and the upper tread molding portion 21d, the temperature of the lug 2a having the largest rubber thickness is increased already, thus reduction in time for vulcanization molding becomes further pronounced.

In this manner, the lug 2a is formed of the unvulcanized rubber member 5, thus flowing of rubber of the casing member 4 into the lower tread molding portion 21c and the upper tread molding portion 21d is suppressed, and thus distortion of the carcass and the belt can be suppressed. In addition, the extrusion preparing portion 22 is provided in the lower mold 20a, thus it is unlikely that the unvulcanized rubber member 5 loaded in the extrusion preparing portion 22 falls out of it, and refitting work of a plurality of lug members that was likely to occur in the past is no more needed, which will further improve work efficiency.

When the pressing member 24 is moved to the unvulcanized rubber member 5, it is preferable that everything is moved at a time to reduce the time required for manufacture. However, if the volume of the land portion is large as in the case of the lug 2a according to this embodiment, the force required for moving the pressing member 24 is increased, which may increase the size of the facility and even decline the productivity. In such a situation, a plurality of pressing members 24 are provided in the tire circumferential direction, and only a part thereof are moved toward the unvulcanized rubber member 5, then the rest of the members are moved in order, thereby avoiding increase in the size of the facility.

Furthermore, the tire performance can be improved by adopting rubbers made from materials different from each other to the rubber for the outermost periphery of the casing member 4 and to the rubber for the unvulcanized rubber member 5 forming the tread portion 2. For example, when the tire 1 for agricultural machine is manufactured as in the case of this embodiment, a foamed rubber may be used as a rubber for the outermost periphery of the casing member 4, which allows water in the mud to be absorbed by the foamed portion when a vehicle drives in a moist place like mud, and thus attachment of mud to the tire 1 can be effectively decreased, then the rubber with high hardness (hardness of 60° to 90° according to the durometer hardness test (A type) of JISK6253) is adopted to the unvulcanized rubber member 5 as well, thereby allowing the wear resistance of the lug 2a to be improved. Furthermore, the rubber with high hardness which is the same as that of the above-mentioned unvulcanized rubber member 5 may be adopted to the outermost periphery of the casing member 4. In this case, generation of cracks on the bottom of the groove of the tread portion 2 can be suppressed.

INDUSTRIAL APPLICABILITY

By the disclosed manufacturing method, distortion of a carcass and a belt in a tire caused by vulcanization for manufacturing tires can be suppressed, and new tires can be stably supplied while reducing the time required for manufacture and improving the work efficiency as well. The disclosed manufacturing method may be used not only for tires for agricultural machines explained in this embodiment, but may preferably be used for manufacture of various tires such as tires for vehicles, tires for track/bus, off the road tires, tires for two wheels, or the like.

REFERENCE SIGNS LIST

1: Tire
2: Tread portion
2a: Lug (land portion)
3: Tire body
4: Casing member
5: Unvulcanized rubber member
10: Extruder
11: Cutting machine
20: Vulcanizing mold
20a: Lower mold
20b: Upper mold
21: Tire molding portion
21a: Lower tire molding portion
21b: Upper tire molding portion
21c: Lower tread molding portion (tread molding portion)
21d: Upper tread molding portion (tread molding portion)
22: Extrusion preparing portion
23: Rubber inflow path
24: Pressing member
25: Bladder (diameter expansion means)

The invention claimed is:

1. A tire manufacturing method in which a vulcanizing mold is used for vulcanization molding to manufacture a tire including a tread portion provided with a land portion, the vulcanizing mold comprising:
   a tire molding portion in which a casing member constituting a tire body is disposed, and which is configured to define an outer surface shape of the tire;
   an extrusion preparing portion in which an unvulcanized rubber member for forming a tread portion can be disposed;
   a pressing member disposed movably toward the extrusion preparing portion; and
   a rubber inflow path communicating between the tire molding portion and the extrusion preparing portion,
   wherein the vulcanizing mold consists of a lower mold and an upper mold, and a lower tire molding portion and an upper tire molding portion provided by dividing the tire molding portion into two are formed inside of the lower mold and the upper mold, respectively,
   wherein the extrusion preparing portion is arranged in the lower mold outward of the lower tire molding portion in the tire radial direction, and the pressing member is arranged in the upper mold at a position outward of the upper tire molding portion and corresponding to the extrusion preparing portion in the tire radial direction,
   wherein the vulcanization molding includes:
      loading the casing member in the tire molding portion and loading the unvulcanized rubber member in the extrusion preparing portion;
      subsequently, extruding the unvulcanized rubber member to a tread molding portion through the rubber inflow path by moving the pressing member relative to the unvulcanized rubber member in the extrusion preparing portion, the tread molding portion being formed in the tire molding portion and configured to define an outer surface shape of the land portion; and
      subsequently, vulcanizing the extruded unvulcanized rubber member and the casing member together.

2. The tire manufacturing method according to claim 1, wherein a rigid core comprising a plurality of core segments is provided inside the vulcanizing mold, the plurality of core segments being disposed movably outward and inward in the tire radial direction, and
   wherein the unvulcanized rubber member is extruded after moving the core segments outward in the tire radial direction to expand a diameter of the casing member.

3. The tire manufacturing method according to claim 1, wherein a rigid core comprising a plurality of core segments is provided inside the vulcanizing mold, the plurality of core segments being disposed movably outward and inward in the tire radial direction, and
   wherein the unvulcanized rubber member is extruded after moving the core segments outward in the tire radial direction to expand a diameter of the casing member.

4. The tire manufacturing method according to claim 1, wherein the vulcanizing mold comprises a plurality of the extrusion preparing portions and a plurality of the press members in the tire circumferential direction, and only a part of the pressing members are moved toward the extrusion preparing portions, then the rest of the pressing members are moved, in order.

* * * * *